No. 759,354. PATENTED MAY 10, 1904.
P. EBELING.
GLASS TANK FURNACE.
APPLICATION FILED JULY 10, 1903.
NO MODEL. 2 SHEETS—SHEET 1.

Witnesses:
Robert C. Totten
G. C. Raymond

Inventor:
Phillip Ebeling
By Kay Totten & Winter
Attorneys

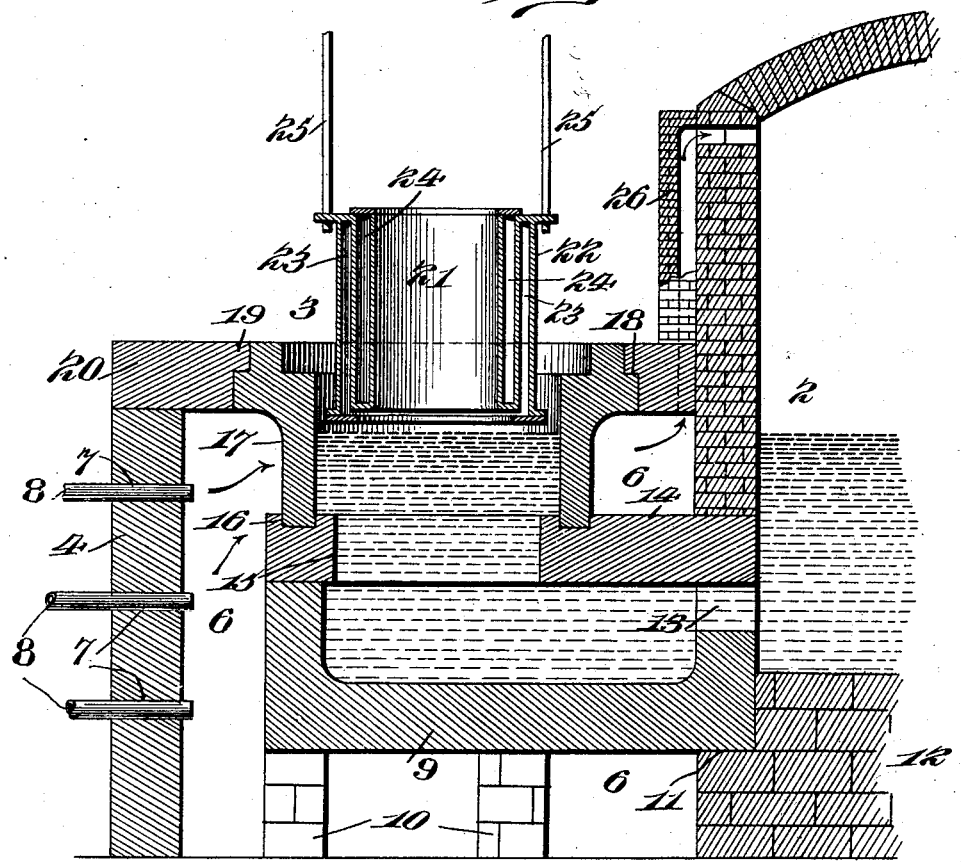

No. 759,354. Patented May 10, 1904.

UNITED STATES PATENT OFFICE.

PHILLIP EBELING, OF MOUNDSVILLE, WEST VIRGINIA.

GLASS-TANK FURNACE.

SPECIFICATION forming part of Letters Patent No. 759,354, dated May 10, 1904.

Application filed July 10, 1903. Serial No. 164,952. (No model.)

*To all whom it may concern:*

Be it known that I, PHILLIP EBELING, a resident of Moundsville, in the county of Marshall and State of West Virginia, have invented a new and useful Improvement in Glass-Tank Furnaces; and I do hereby declare the following to be a full, clear, and exact description thereof.

My invention relates to glass-tanks, and more especially to the working-out compartments of such tanks.

The object of my invention is to provide a working-out compartment in which the molten glass is so acted on by the heat as to keep it of the proper consistency for drawing and blowing, so that a constantly-maintained source of molten-glass supply is had.

To these ends my invention comprises, generally stated, in connection with a suitable glass-tank, a working-out compartment communicating with said tank and an independent heating-chamber surrounding said compartment, whereby the glass in said compartment is maintained at proper consistency for drawing and blowing.

My invention further comprises certain improvements in the construction of said compartment, all as fully hereinafter set forth and claimed.

To enable others skilled in the art to make and use my invention, I will describe the same more fully, referring to the accompanying drawings, in which—

Figure 1:
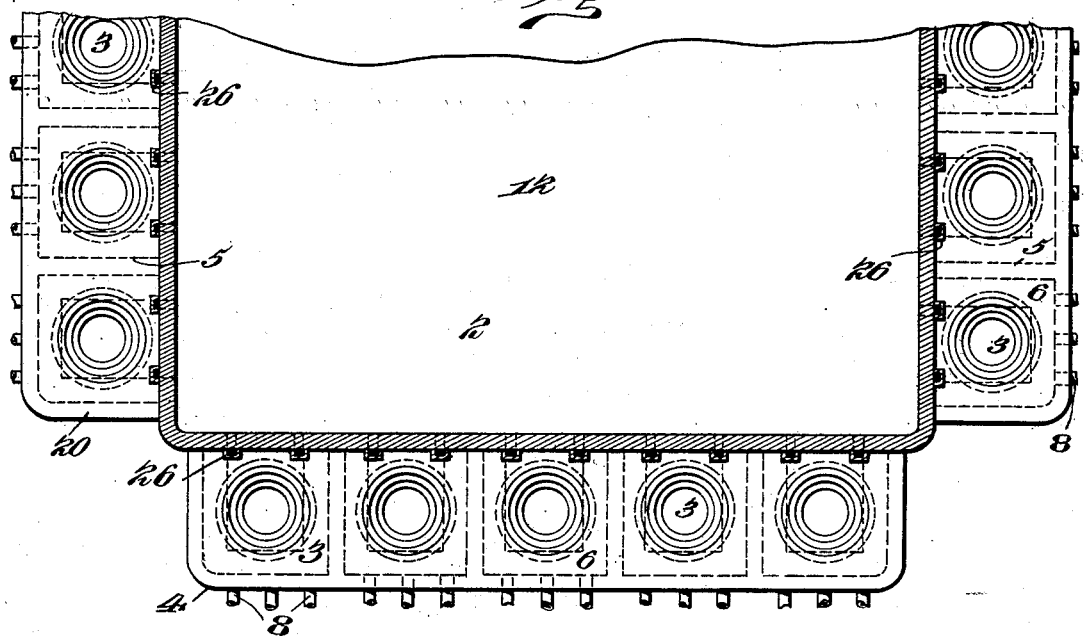
Figure 3:
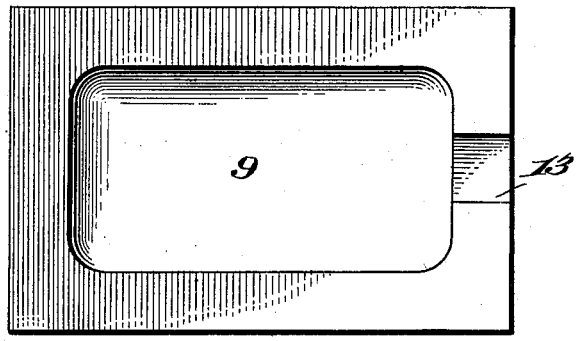
Figure 4:
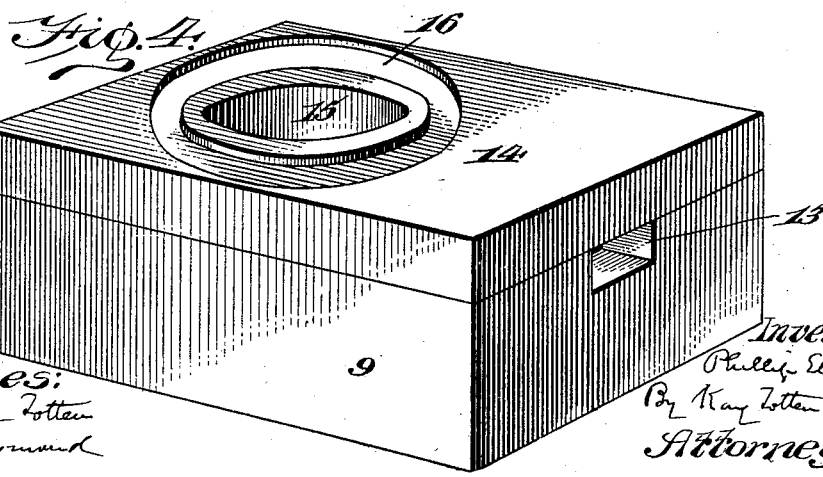

Figure 1 is a plan view of a portion of a glass-tank with my invention applied thereto. Fig. 2 is a sectional elevation of the working-out compartment and a portion of the tank. Fig. 3 is a plan view of the bottom section of working-out compartment, and Fig. 4 is a perspective view of bottom section with cover.

Like numerals indicate like parts in each of the figures.

In the drawings, the numeral 2 designates the working-out end of a glass-tank of the Siemens type or any other suitable construction. Located at suitable intervals along the end and sides of the working-out end 2 of the tank are the working-out compartments 3. These working-out compartments are inclosed by the outer walls 4 and the division-walls 5, which form the heating-chambers 6, within which each working-out compartment is located. Entering apertures 7 in the walls 4 are the pipes 8, by means of which gas is admitted to the heating-chambers 6, said pipes being controlled by suitable valves. The working-out compartment, as illustrated in Fig. 2, is preferably made up of the following parts: A box-like bottom portion 9 composed of suitable refractory material is supported within the heating-chamber 6 by means of the brick piers 10 and the ledge 11 of the foundation 12 of the tank. This bottom portion 9 has the opening 13, by means of which the molten glass flows from the tank into the receptacle formed within said bottom. A cover 14 is provided for the bottom 9, said cover having the circular opening 15. Surrounding the opening 15 is the annular groove 16, within which the lower end of the ring or collar 17 fits. The upper end of ring 17 has the shoulder 18, with which the inwardly-projecting lip 19 on the top piece 20 engages.

Extending down within the opening in the ring 17 is a portion of apparatus, such as used by me in carrying out a certain method for forming hollow glass articles, set forth and claimed in Letters Patent of the United States No. 682,980, granted to me on the 17th day of September, 1901. By that method the glass is drawn up through a mold provided with means for chilling the blank. Accordingly the numeral 21 designates the mold inclosed by the jacket 22, having water-chamber 23 and air-chamber 24. The jacket 22 is supported by the rods 25. Flues 26 lead from the heating-chamber 6 to the tank.

In practice the glass as it is "fined" flows to the working-out end 2 of the tank and passes therefrom through the openings 13 into the bottom 9 of the working-out compartment. The glass as it rises passes up into the ring 17. The gas admitted by the pipes 8 having been lighted, the temperature of the heating-chamber is raised and maintained at the proper degree to keep the glass at the proper consistency for working. The working-out compartment is thus subjected to the action of the heat, the bottom portion 9 on three of its sides and top and bottom, while the ring 17, from which the glass is drawn directly, is encircled by a zone of heat. The waste products of combustion pass from the heating chamber by the flues 26 to the tank, where they commingle with the products of combustion within said tank and aid in keeping the furnace up to the proper temperature.

My invention will be found to be particularly applicable for use in connection with the method set forth in the above-recited Letters Patent, as there is a constantly-maintained source of molten-glass supply in convenient position for working out by lowering a "bait" into the glass and drawing the same up through a mold arranged in close proximity to the molten-glass supply. By having the working-out compartment made up of the parts described it is a very simple matter to remove the parts and substitute new ones for any that are worn out.

What I claim as my invention, and desire to secure by Letters Patent, is—

1. In a glass-tank having a heating-chamber adjacent thereto provided with independent heating means, a working-out compartment located within said heating-chamber and closed against the direct action of the heat upon the glass therein, said working-out compartment having an opening for admitting the glass from said tank thereto.

2. In a glass-tank having a heating-chamber adjacent thereto, a working-out compartment located within said heating-chamber and closed against the direct action of the heat upon the glass therein, gas-supply pipes leading into said chamber, said working-out compartment having an opening for admitting glass from said tank thereto.

3. In a glass-tank having a heating-chamber adjacent thereto, a working-out compartment communicating with said tank and located within said chamber, and a ring forming the upper portion of said compartment.

4. In a glass-tank having a heating-chamber adjacent thereto, a working-out compartment communicating with said tank and located within said chamber, comprising a box-like bottom portion, said bottom portion having a contracted opening, and a circular chamber communicating with said bottom portion by means of said contracted opening.

5. In a glass-tank having a heating-chamber adjacent thereto, a working-out compartment communicating with said tank and located in said chamber, comprising a box-like bottom portion, a cover for said bottom portion having an opening therein, and a ring supported by said cover.

6. In a glass-tank having a heating-chamber adjacent thereto, a working-out compartment communicating with said tank and located in said chamber, comprising a box-like bottom portion, a cover for said bottom portion having a circular opening therein, said cover having an annular groove formed around said opening, and a ring fitting in said groove.

7. In a glass-tank having a heating-chamber adjacent thereto provided with independent heating means and with flues leading to said tank, and a working-out compartment having an opening at the lower end thereof communicating with said tank and located in said heating-chamber.

8. In a glass-tank having a heating-chamber adjacent thereto provided with independent heating means and with flues leading from said chamber to or close to the top of said tank, and a working-out compartment having an opening at the lower end thereof communicating with said tank and located in said chamber.

In testimony whereof I, the said PHILLIP EBELING, have hereunto set my hand.

PHILLIP EBELING.

Witnesses:
MICHAEL CALLAHAN,
C. B. ROE.